(12) United States Patent
Kirsch

(10) Patent No.: US 7,069,416 B2
(45) Date of Patent: *Jun. 27, 2006

(54) METHOD FOR FORMING A SINGLE INSTRUCTION MULTIPLE DATA MASSIVELY PARALLEL PROCESSOR SYSTEM ON A CHIP

(75) Inventor: Graham Kirsch, Hants (GB)

(73) Assignee: Micron Technology, Inc., Boise, ID (US)

( * ) Notice: Subject to any disclaimer, the term of this patent is extended or adjusted under 35 U.S.C. 154(b) by 76 days.

This patent is subject to a terminal disclaimer.

(21) Appl. No.: 10/859,972

(22) Filed: Jun. 4, 2004

(65) Prior Publication Data

US 2004/0221135 A1    Nov. 4, 2004

Related U.S. Application Data

(63) Continuation of application No. 09/645,580, filed on Aug. 25, 2000, now Pat. No. 6,754,802.

(51) Int. Cl.
G06F 15/80 (2006.01)
G06F 13/40 (2006.01)

(52) U.S. Cl. .............................. 712/13; 712/14; 712/16
(58) Field of Classification Search ................. 712/13, 712/16, 14
See application file for complete search history.

(56) References Cited

U.S. PATENT DOCUMENTS

| | | | |
|---|---|---|---|
| 3,789,372 A * | 1/1974 | Lejon | ........................... 365/237 |
| 4,876,641 A * | 10/1989 | Cowley | ........................ 712/13 |
| 5,153,684 A * | 10/1992 | Shoji et al. | .................. 257/315 |
| 5,581,773 A | 12/1996 | Glover | |
| 5,638,533 A | 6/1997 | Law | |
| 5,727,229 A | 3/1998 | Kan et al. | |
| 5,860,084 A | 1/1999 | Yaguchi | |
| 5,962,844 A | 10/1999 | Merrill et al. | |
| 5,963,746 A | 10/1999 | Barker et al. | |
| 6,061,367 A | 5/2000 | Siemers | |
| 6,205,533 B1 | 3/2001 | Margolus | |
| 6,754,802 B1 * | 6/2004 | Kirsch | ......................... 712/14 |

OTHER PUBLICATIONS

Michael J. Flynn, "Very High-Speed Computing Systems," Proceedings of the IEEE, vol. 54, No. 12, Dec. 1966, pp. 1901-1909.

(Continued)

*Primary Examiner*—Daniel Pan
(74) *Attorney, Agent, or Firm*—Dickstein Shapiro Morin & Oshinsky LLP

(57) ABSTRACT

A single chip active memory includes a plurality of memory stripes, each coupled to a full word interface and one of a plurality of processing element (PE) sub-arrays. The large number of couplings between a PE sub-array and its associated memory stripe are managed by placing the PE sub-arrays so that their data paths run at right angle to the data paths of the plurality of memory stripes. The data lines exiting the memory stripes are run across the PE sub-arrays on one metal layer. At the appropriate locations, the data lines are coupled to another orthogonally oriented metal layer to complete the coupling between the memory stripe and its associated PE sub-array. The plurality of PE sub-arrays are mapped to form a large logical array, in which each PE is coupled to four other PEs. Physically distant PEs are coupled using current mode differential logical couplings an drivers to insure good signal integrity at high operational speeds. Each PE contains a small DRAM register array.

15 Claims, 10 Drawing Sheets

OTHER PUBLICATIONS

Norman Margolus, "An Embedded DRAM Architecture for Large-Scale Spatial-Lattice Computations," Computer Architecture News Conference, vol. 28, No. 2, May 2000; pp. 149-160.

FUZION 150 Product Overview, PixelFusion Ltd, PFL/004/99 v2. Revised Jan. 2000.

Gamma II Plus Technical Overview (visited Jul., 2000) www.cppus.com/techoverview.pdf.

* cited by examiner

METHOD FOR FORMING A SINGLE INSTRUCTION MULTIPLE DATA MASSIVELY PARALLEL PROCESSOR SYSTEM ON A CHIP This application is a continuation of application Ser. No. 09/645,580, filed Aug. 25, 2000 (now U.S. Pat. No. 6,754,802), the subject matter of which is incorporated by reference herein.

FIELD OF THE INVENTION

The present invention relates to the field of massively parallel processing systems, and more particularly to the interconnection among processing elements and between processing elements and memory in a single chip massively parallel processor chip.

BACKGROUND OF THE INVENTION

The fundamental architecture used by all personal computers (PCs) and workstations is generally known as the von Neumann architecture, illustrated in block diagram form in FIG. 1. In the von Neumann architecture, a main central processing unit (CPU) 10 is coupled via a system bus 11 to a memory 12. The memory 12, referred to herein as "main memory", also contains the data on which the CPU 10 operates. In modern computer systems, a hierarchy of cache memories is usually built into the system to reduce the amount of traffic between the CPU 10 and the main memory 12.

The von Neumann approach is adequate for low to medium performance applications, particularly when some system functions can be accelerated by special purpose hardware (e.g., 3D graphics accelerator, digital signal processor (DSP), video encoder or decoder, audio or music processor, etc.). However, the approach of adding accelerator hardware is limited by the bandwidth of the link from the CPU/memory part of the system to the accelerator. The approach may be further limited if the bandwidth is shared by more than one accelerator. Thus, the processing demands of large data sets, such as those commonly associated with large images, are not served well by the von Neumann architecture. Similarly, as the processing becomes more complex and the data larger, the processing demands will not be met even with the conventional accelerator approach.

It should be noted, however, that the von Neumann architecture has some advantages. For example, the architecture contains a homogenous memory structure allowing large memories to be built from many smaller standard units. In addition, because the processing is centralized, it does not matter where the data (or program) resides in the memory. Finally, the linear execution model is easy to control and exploit. Today's operating systems control the allocation of system memory and other resources using these properties. The problem is how to improve processing performance in a conventional operating system environment where multiple applications share and partition the system resources, and in particular, the main memory.

One solution is to utilize active memory devices, as illustrated in FIG. 2, in the computer system. Put simply, active memory is memory that can do more than store data; it can process it too. To the CPU 10 the active memory 15 looks normal except that it can be told to do something with the data contents and without the data being transferred to the CPU or another part of the system (via the system bus 11). This is achieved by distributing an array 14 of processing elements (PEs) 200 throughout the memory structure, which can all operate on their own local pieces of memory in parallel. The array 14 of PEs 200 are coupled to the memory 12 via an high speed connection network 13. In addition, PEs 200 of the array 14 can communication with each other. Thus, active memory encourages a somewhat different view of the computer architecture, i.e., "memory centered" or viewed from the data rather than the processor.

In a computer system having active memory, such as illustrated in FIG. 2, the work of the CPU 10 is reduced to the operating system tasks, such as scheduling processes and allocating system resources and time. Most of the data processing is performed within the memory 15. By having a very large number of connections between the main memory 12 and the processing resources, i.e., the array 14 of PEs 200, the bandwidth for moving data in and out of memory 12 is greatly increased. A large number of parallel processors can be connected to the memory 12 and can operate on their own area of memory independently. Together these two features can provide very high performance.

There are several different topologies for parallel processors. One example topology is commonly referred to as SIMD (single instruction, multiple data). The SIMD topology contains many processors, all executing the same stream of instructions simultaneously, but on their own (locally stored) data. The active memory approach is typified by SIMD massively parallel processor (MPP) architectures. In the SIMD MPP, a very large number (for example, one thousand) of relatively simple PEs 200 are closely connected to a memory and organized so that each PE 200 has access to its own piece of memory. All of the PEs 200 execute the same instruction together, but on different data.

The SIMD MPP has the advantage that the control overheads of the system are kept to a minimum, while maximizing the processing and memory access bandwidths. SIMD MPPs, therefore, have the potential to provide very high performance very efficiently. Moreover, the hardware consists of many fairly simple repeating elements. Since the PEs 200 are quite small in comparison to a reduced instruction set computer (RISC), they are easy to implement into a system design and their benefit with respect to optimization is multiplied by the number of processing elements. In addition, because the PEs 200 are simple, it is possible to clock them fast and without resorting to deep pipelines.

In a massively parallel processor array, the design of the interconnections among the processing elements and the interconnections between the PEs 200 and the memory 12 are an important feature. Traditional massively parallel processors utilize a plurality of semiconductor chips for the processor element array 14 and the memory 12. The chips are connected via a simple network of wires. However, as shown in FIG. 3, advances in semiconductor technology now permits a SIMD massively parallel processor with a memory to be integrated onto a single active memory chip 100. Since signals which are routed within a semiconductor chip can travel significantly faster than inter-chip signals, the single chip active memory 100 has the potential of operating significantly faster than a prior art SIMD MPP. However, achieving high speed operation requires more than merely integrating the elements of a traditional prior art SIMD MPP into one active memory chip 100. For example, careful consideration must be given to the way the PEs 200 of the PE array 14 are wired together, since this affects the length of the interconnections between the PEs 200 (thereby affecting device speed), the mapping of the memory from as seen by the PEs 200, the power consumed to drive the interconnection network, and the cost of the active memory chip 100. Accordingly, there is a desire and need for an affordable high speed SIMD MPP active memory chip with an optimized interconnection arrangement between the PEs.

SUMMARY OF THE INVENTION

In one aspect, the present invention is directed to a single chip active memory with a SIMD MPP. The active memory chip contains a full word interface, a memory in the form of a plurality of memory stripes, and a PE array in the form of a plurality of PE sub-arrays. The memory stripes are arranged between and coupled to both the plurality of PE sub-arrays and the full word interface. Each PE sub-array is coupled to the full word interface and a corresponding memory stripe. In order to route the numerous couplings between a memory stripe and its corresponding PE sub-array, the PE sub-array is placed so that its data path is orthogonal to the orientation of the memory stripes. The data lines of the PE sub-arrays are formed on one metal layer and coupled to the memory stripe data lines which are formed on a different metal layer having an orthogonal orientation.

In another aspect of the present invention, the PEs each contain a small register file constructed as a small DRAM array. Small DRAM arrays are sufficiently fast to serve as a register file and utilize less power and semiconductor real estate than traditional SRAM register files.

In another aspect of the invention, the PE array of the active memory chip is formed by coupling the plurality of PE sub-arrays into a single logical array in accordance to a mapping technique. The mapping technique of the invention include mapping each PE sub-array into the logical array as a row (optionally with row interleaving), a rectangular region, or a column. Each PE of the logical array is coupled to four other PEs along its (logical) north, south, east, and west axis. PEs which are located at the corners or along the edges of the logical array have couplings along their exterior edges which wrap around the array to opposite corner and edge PEs, respectively. Depending on the mapping, some PEs may be coupled to other PEs which are (physically) distant and the present invention uses current mode differential logical couplings and drivers for its long distance PE-to-PE couplings.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF THE PREFERRED EMBODIMENTS

Figure 1:
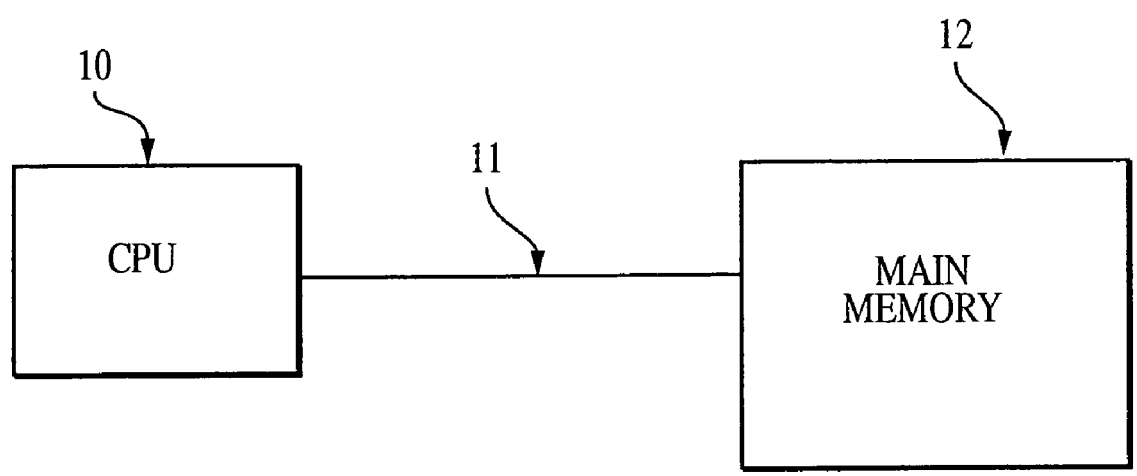
FIG. 1 illustrates in block diagram form a conventional von Neumann computer architecture.
Figure 2:
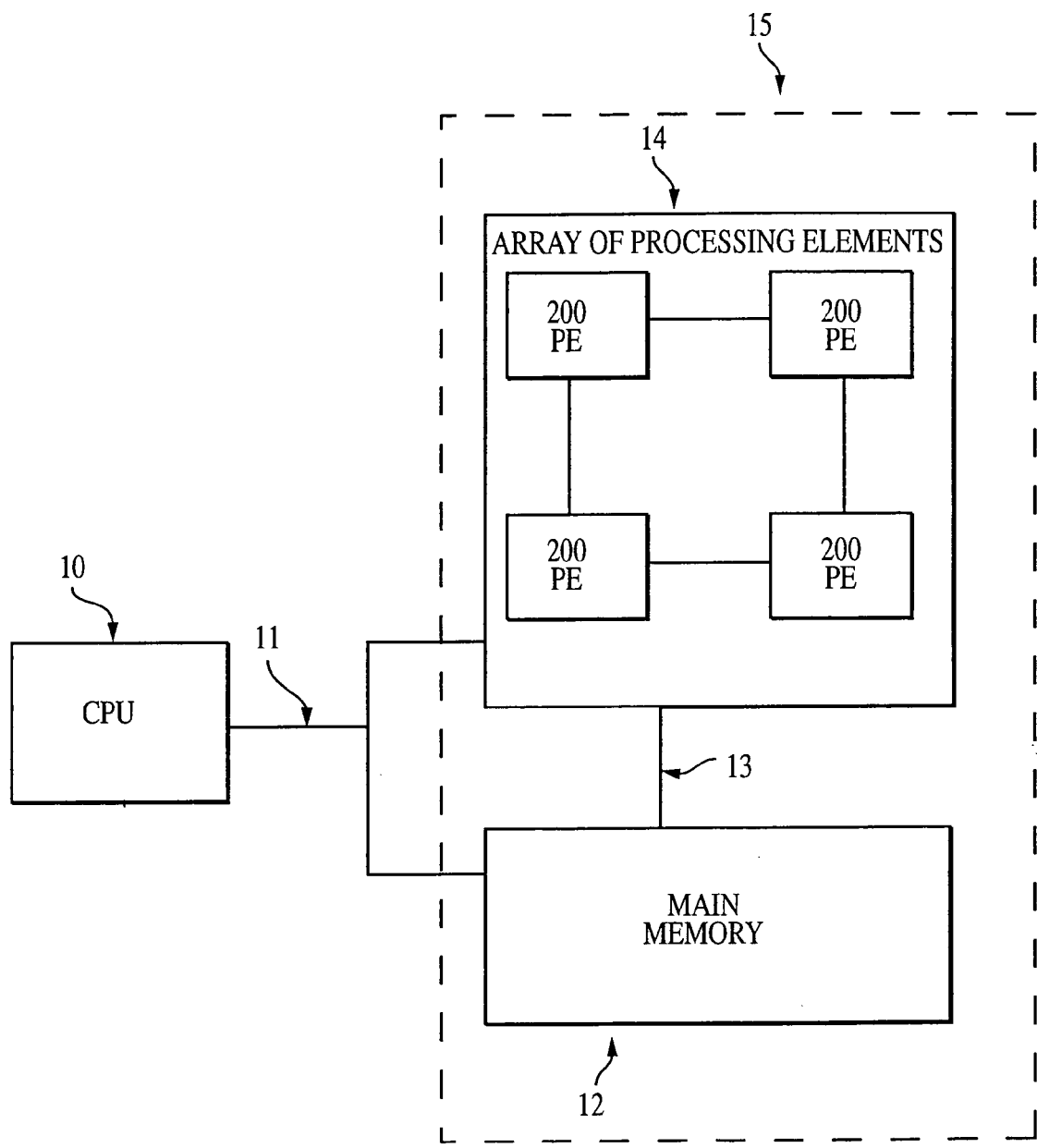
FIG. 2 illustrates in block diagram form the architecture of computer system with an active memory.
Figure 3:
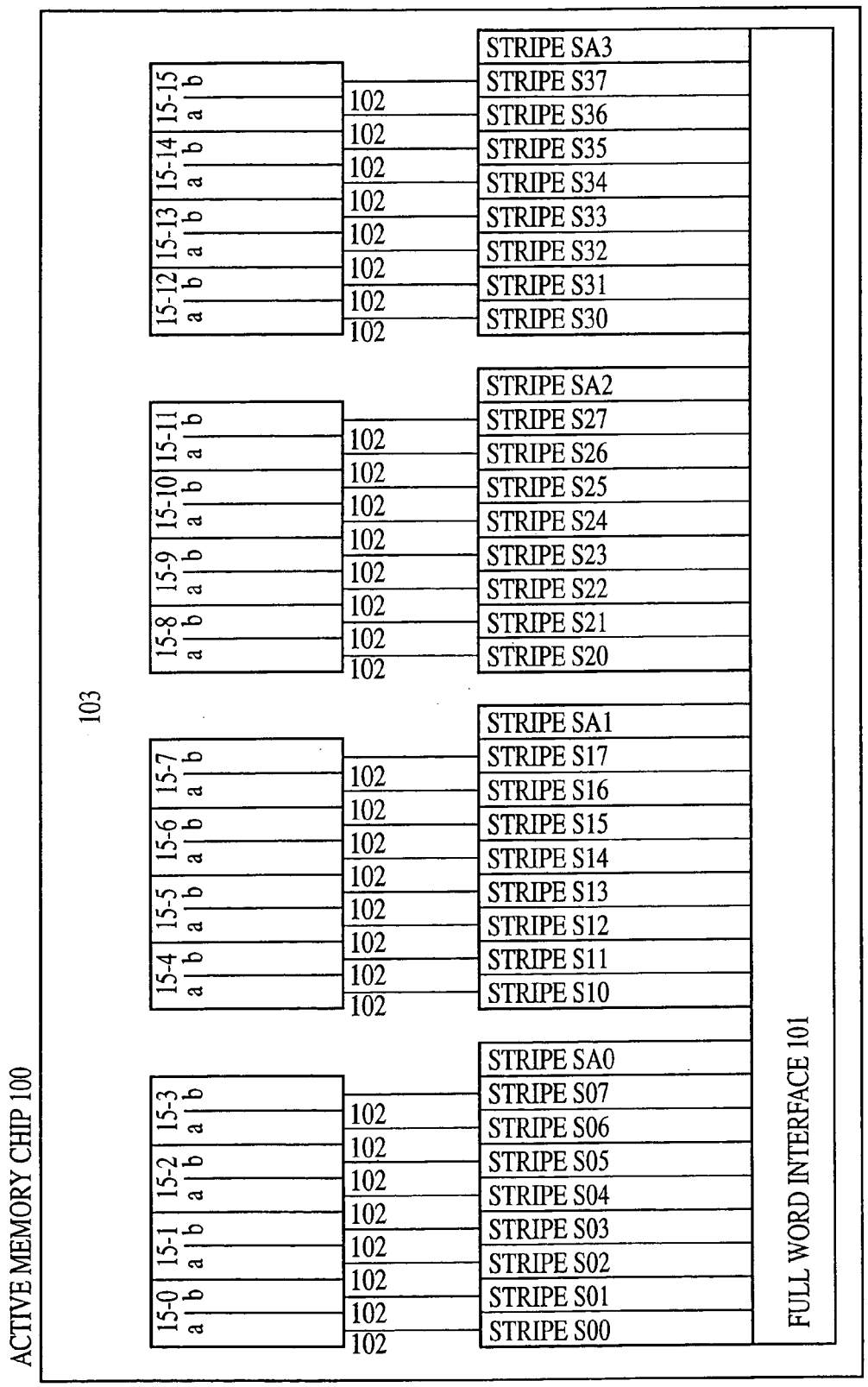
FIG. 3 illustrates in block diagram form the layout of a single chip active memory system.

Now referring to the drawing, where like reference numerals designate like elements, there is shown in FIG. 3 a block diagram of a single chip active memory 100. The active memory chip 100 contains several components integrated onto a substrate 103, including a plurality of 8×8 PE arrays 15-0–15-15, a plurality of memory areas formed as stripes S00–S07, S10–S17, S20–S27, S30–S37, SA0–SA3, and a full word interface 101.

Figure 4:
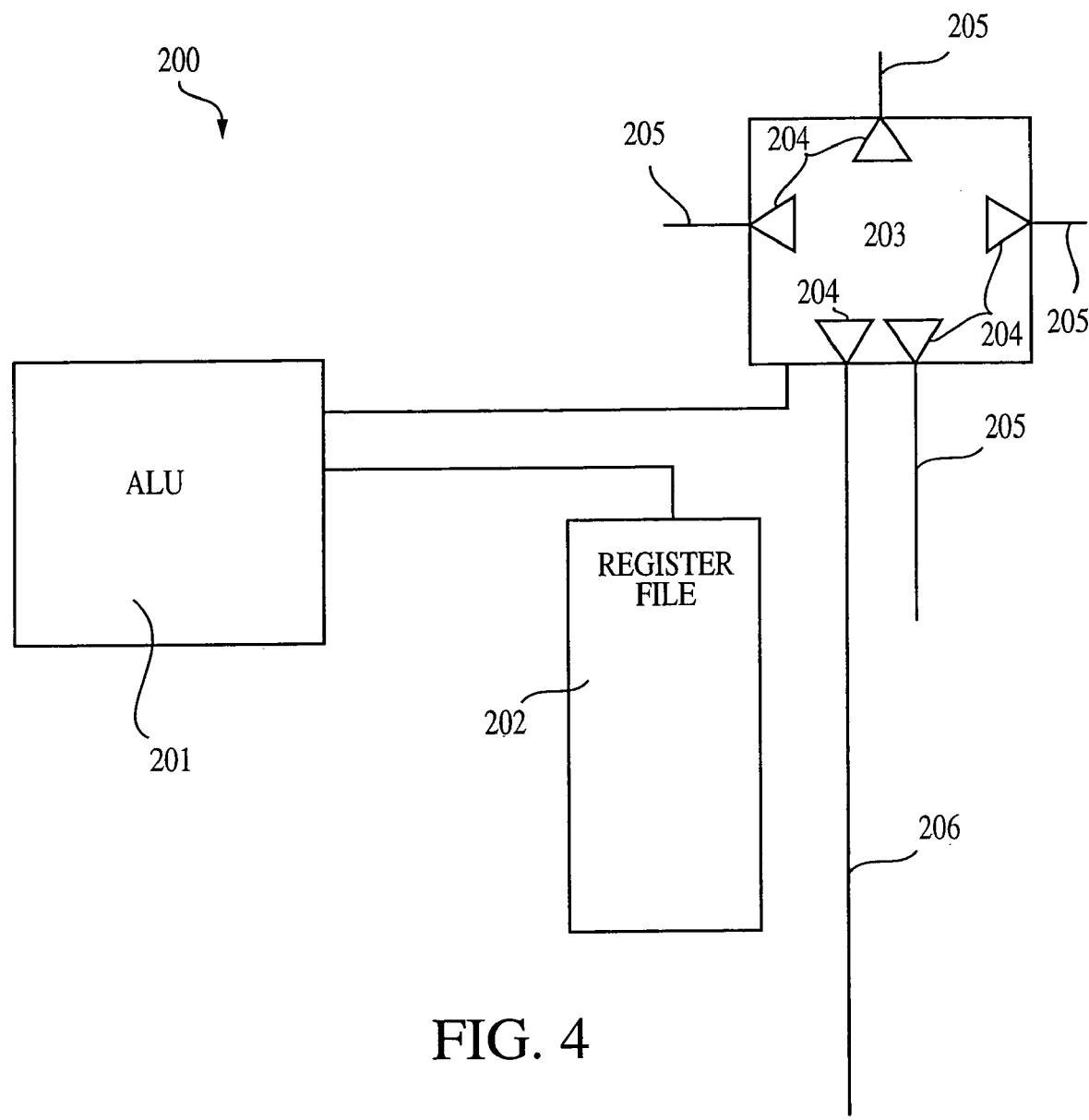
FIG. 4 illustrates in block diagram form a processing element.

As shown in FIG. 4, the PEs 200 include an arithmetic logic unit (ALU) 201. In the exemplary embodiment, the ALU 201 is an 8-bit integer ALU, but ALUs of different types may also be used. Suitable ALUs may include, for example 1-bit and 32-bit integer ALUs, or 32-bit floating point ALUs. The ALU 201 is coupled to a register file 202 and an interconnect cell 203.

The register file 202 needs to be small, fast, and low powered, since prior art register files typically occupy approximately one third of the total area of the PE 200 and approximately 75% of its power consumption. In the exemplary embodiment, a dynamic random access memory (DRAM) is used to form the register file. DRAM is not ordinarily used to form register files because it is normally considered to be too slow and requires periodic refreshing. However, in the present context, DRAM offers several advantages. The register file 202 is a very small memory. For example, register file 202 may have only 64 locations. A small DRAM array has very short word lines and can be operated at high speeds. Additionally, DRAM refreshes can be controlled by a simple logic without adversely affecting the processing throughput of the PE. This is a consequence of the SIMD processing of the active memory chip 100, since every PE 200 of the active memory chip performs the same processing at any given time. Thus, whenever there is an opportunity to refresh the DRAM which make up the register file 202 of any PE 200, every DRAM register file 202 can also be simultaneously refreshed. Since DRAM cells are smaller and use fewer transistors than SRAM cells, the use of a small DRAM for the register file 202 permits high speed operation with low power consumption, and occupies less space than a traditional SRAM register file.

The PE 200's ALU 201 is also coupled to an interconnect cell 203. The interconnect cell 203 is used to couple the PE 200 to four other PE's 200 via connections 205 and to a memory strip S00–S07, S10–S17, S20–S27, S30–S37 of the active memory chip 100 via a connection 206. The connections 205, 206 are bidirectional communication links. Output data is driven onto the connections 205, 206 via drivers 204. The connections 205 and drivers 204 may be of differing types. The PEs 200 are ordinarily coupled to other PEs 200 which are physically close. Near distance couplings use single ended connections driven by CMOS drivers, in order to reduce power consumption. Thus, in most instances, the connection 205 is one single ended signal line and the driver 204 is a CMOS driver. However, some of the PE-to-PE connections 205 will need to traverse a significant distance. At high clock frequencies, CMOS drivers and single ended connections may not be capable of driving signals over a long distance without significant degradation in signal integrity. For these connections, the present invention uses a pair of signal lines coupled to a differential drivers. In the exemplary embodiment, long distance PE-to-PE couplings are implemented with current mode differential logic as the type of differential drivers.

Figure 5:
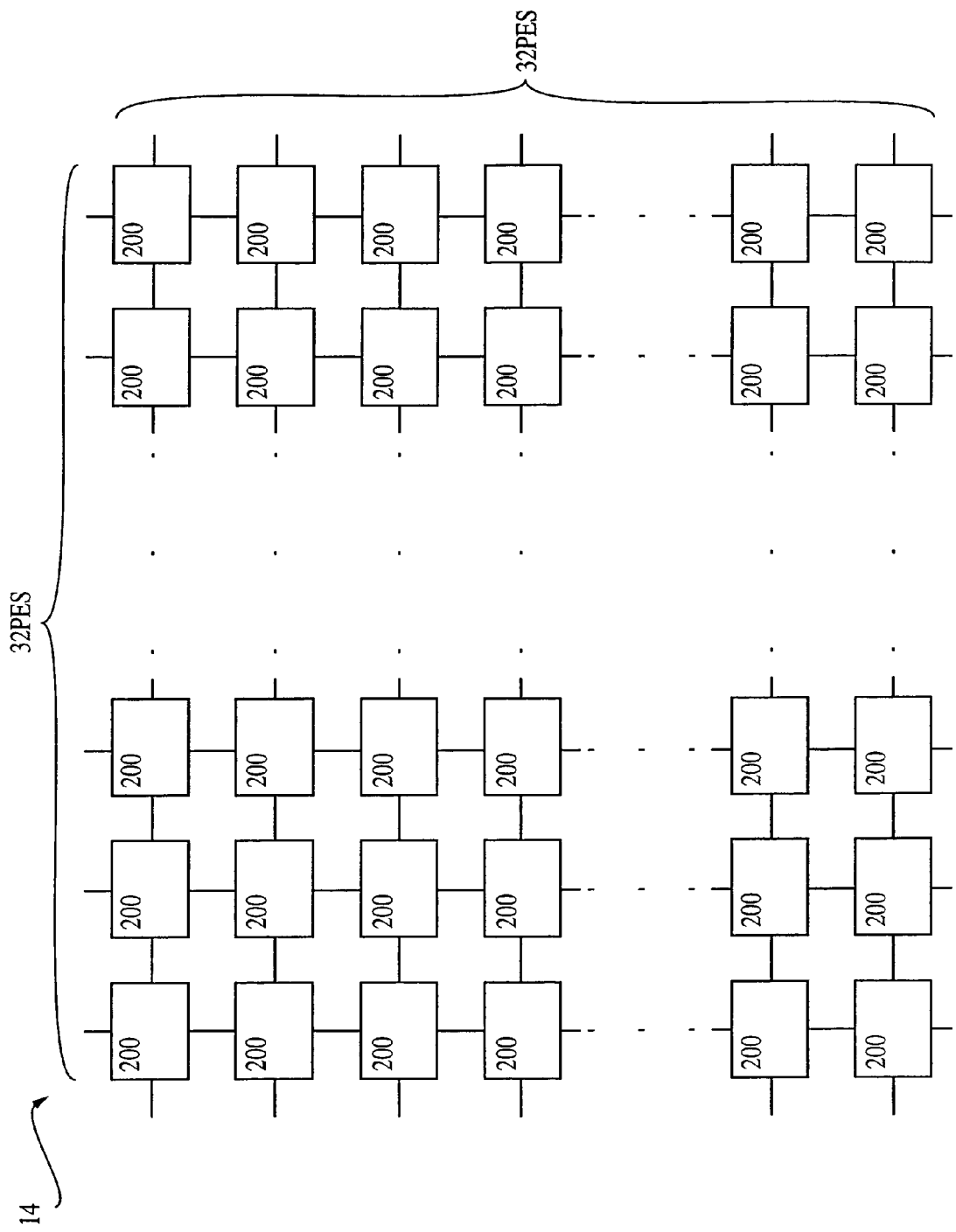
FIG. 5 illustrates the logical array formed by mapping processing element sub-arrays.

In the exemplary embodiment, the active memory chip 100 includes one thousand twenty-four PEs 200 which are physically distributed over the sixteen 8×8 PE arrays 15-0–15—15. Each of the sixteen 8×8 PE arrays contain sixty-four PEs 200, which are physically arranged in a 8×8 format, and can be further subdivided into two 8×4 sub-arrays 15-0a–15-15a, 15-0b–15-15b. Collectively, as shown in FIG. 5, the PEs 200 contained within the thirty-two sub-arrays 15-0a–15-15b are wired to form a single 32×32 logical array 14, in which each PE 200 is capable of communicating with four logically adjacent PEs in its north, south, east, and west directions. PE's 200 which are located on the periphery of the logical array 14 will have one (for PEs located along the edges) or two (for corner PEs) communication links which wrap around the logical array 14, thereby permitting each PE 200 to communicate with four other PEs 200. In addition to the interconnection between PEs 200, each PE 200 is also coupled to a portion of the memory of the active memory chip 100 via a plurality of buses 102. In the exemplary embodiment, each 8×4 sub-array of PEs 15-0a–15-15b is coupled via buses 102 to a memory stripe S00–S07, S10–S17, S20–S27, S30–S37 (described below) located near each array.

The memory of the active memory chip 100 includes a plurality of memory stripes S00–S07, S10–S17, S20–S27, S30–S37, SA0–SA3. In the exemplary embodiment, the active memory chip 100 is a 144 Mbit chip which contains 128 Mbit of data storage and 16 Mbit of additional storage. The 128 Mbit of data storage is evenly distributed across thirty-two 4 Mbit memory stripes S00–S07, S10–S17, S20–S27, S30–S37. The thirty-two memory stripes may be organized into a first S00–S07, second S10–S17, third S20–S27, and fourth S30–S37 groups. The 16 Mbit of additional storage is evenly distributed across four additional stripes SA0–SA3 and may be used to store parity or error correction codes. The use of additional storage for parity or error correction purposes is well known in the art and will not be further described or illustrated in order to avoid obscuring the invention.

The memory stripes S00–S07, S10–S17, S20–S27, S30–S37 are each coupled to one of the 8×4 sub-arrays 15-0a–15-15b and the full word interface 101. Since the 8×4 sub-arrays 15-0a–15-15b are located on the opposite side from the full word interface 101, the memory stripes S00–S07, S10–S17, S20–S27, S30–S37 have two sets of sense amplifiers and repair logic. One set of sense amplifiers and repair logic is located near the full word interface 101 and the other set is located near the 8×4 sub-arrays 15-0a–15-15b. The coupling of a memory stripe S00–S07, S10–S17, S20–S27, S30–S37 to a 8×4 sub-array 15-0a–15-15b is performed by a set of four 64-bit buses 102. Each of the four 64-bit wide buses is coupled to one column of the corresponding 8×4 PE sub-array 15-0a–15-15b. Each of the eight PEs 200 in a row of the 8×4 PE sub-array 15-0a–15-15b is associated with a respective 8-bits of that 64-bit bus. This mechanism of connecting the memory stripes to the 8×4 PE sub-arrays 15-0a–15-15b maintains the same distance between each 8×4 PE sub-array 15-0a–15-15b and is associated memory stripe S00–S07, S10–S17, S20–S27, S30–S37, respectively.

Figure 10:
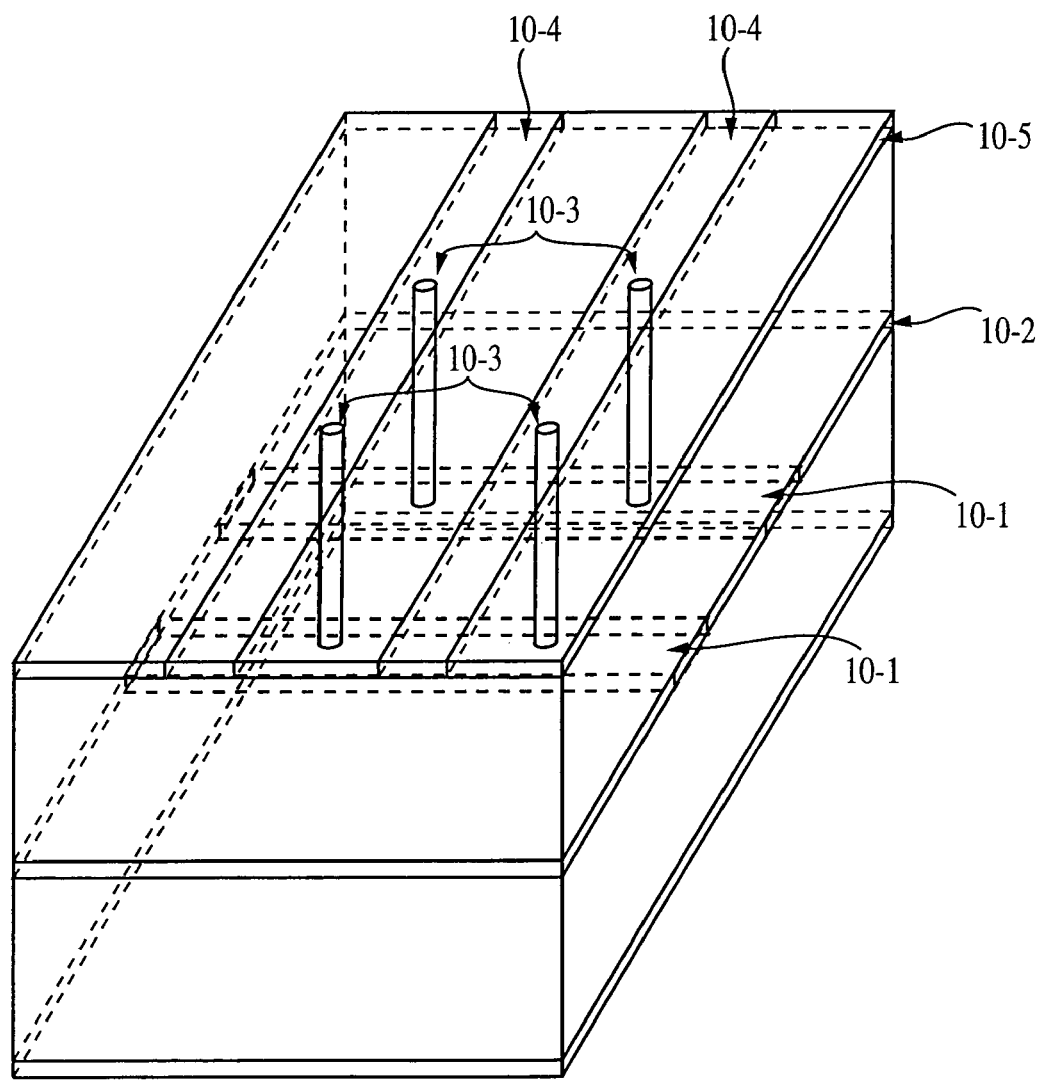
FIG. 10 illustrates how different metal layers can be used to coupled the I/O lines of the memory stripes to the I/O lines of the processing element sub-arrays.

Physically wiring the memory stripes S00–S07, S10–S17, S20–S27, S30–S37 to their associated 8×4 PE sub-arrays 15-0a–15-15b requires a large number of connections. For example, the groups of four 64-bit buses 102 each require 256 data lines. Referring now to FIG. 10, the present invention wires the memory stripes S00–S07, S10–S17, S20–S27, S30–S37 to the PE sub-arrays 15-0a–15-15b by routing memory stripe I/O lines 10-1 to a first metal layer 10-2, running them towards the 8×4 PE sub-arrays 15-0a–15-15b. When the memory stripe I/O lines 10-1 approach an appropriate PE 200, vias 10-3 are used to couple the memory stripe I/O lines 10-1 to sub-array I/O lines 10-4. The sub-array I/O lines 10-4 are located on a second metal layer 10-5, which has the I/O lines 10-4 oriented orthogally to the I/O lines 10-1. To facilitate this routing mechanism, the 8×4 PE sub-arrays 15-0a–15-15b are placed so that the sub-array I/O lines 10-4 run at right angles to the memory stripes I/O lines 10-1.

The active memory chip's 100 interface 101 is a full word width interface. The use of a full word width interface, which permits a single chip to store a plurality of words, is important in an active memory system because the active memory system needs to efficiently satisfy the needs of both an external user such as CPU 10 and the logical array 14 of PEs 200. Memory chips which do not contain a full word interfaces are typically assembled onto a memory module wherein each memory chip stores a subset of bits corresponding to a word of memory. Such arrangements are unsuitable for efficient processing by the logical array 14 of PEs 200 because it would require the PEs 100 to perform off-chip communications in order to process data organized in the word order of the external CPU 10. In the exemplary embodiment, the active memory chip 100 utilizes a SLDRAM interface or a RAMBUS interface. Both the SLDRAM and RAMBUS memory devices use 16-bit interfaces and store data corresponding to bits 0–7 in the first S00–S07 and third S20–S27 groups of memory stripes, and data corresponding to bits 8–15 in the second S10–S17 and fourth S30–S37 groups of memory stripes. The requirement for efficiently satisfying the processing requirements of both the array 14 of PEs 200 and the external CPU 10 is a concern which affects the design of the interconnections among the PEs 200.

As shown in FIG. 5, the logical array 14 of PEs 32 is a 32×32 lattice of PEs 200. Although the PEs 200 are physically located in a plurality of 8×4 sub-arrays 15-0a–15-15b, this physical grouping is designed to facilitate connection of individual PEs to corresponding memory stripes S00–S07, S10–S17, S20–S27, S30–S37. The wiring scheme used to connect the PEs 200 within each 8×4 sub-array 15-0a–15-15b to each other, and to the PEs of other 8×4 sub-arrays 15-0a–15-15b to form the 32×32 logical array 14 is a separate matter. The present invention contemplates several of embodiments for wiring the PEs 200 in each 8×4 array 15-0a–15-15b to form the 32×32 array 14.

Figure 6:
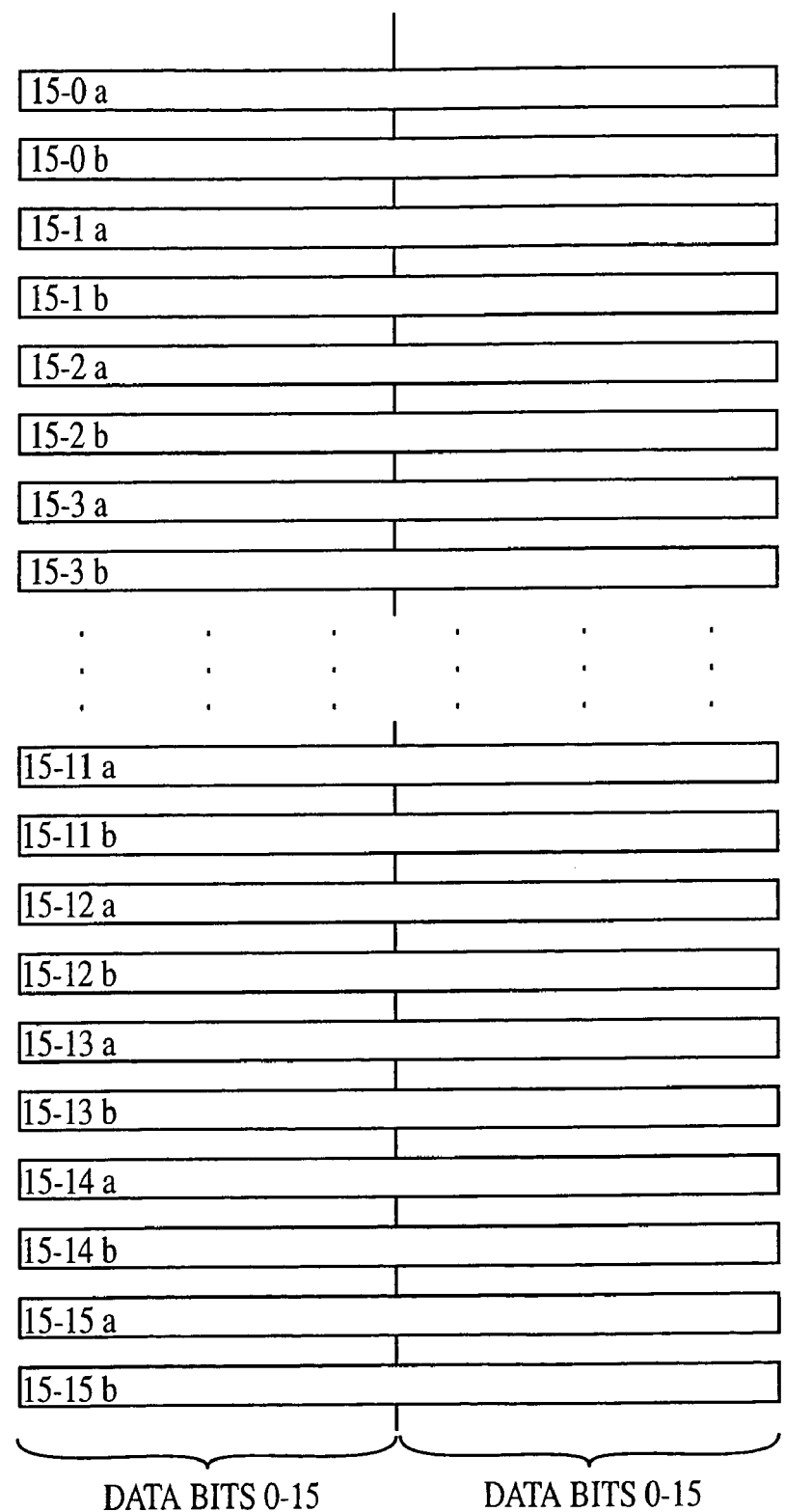
FIGS. 6, 7, 8, and 9 illustrate different mapping techniques which an be used to form the logical array of FIG. 5.
Figure 7:
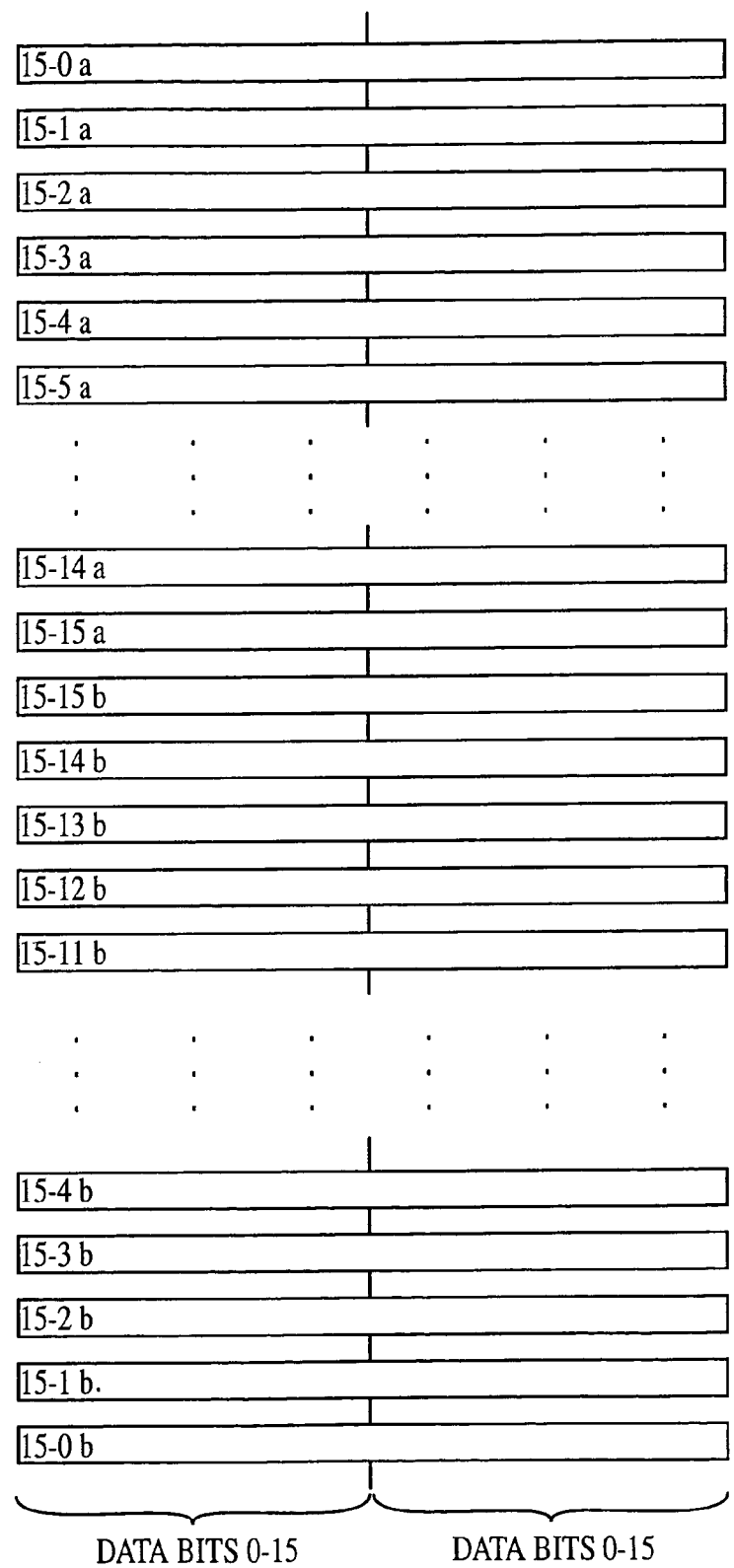

FIGS. 6 and 7 show two similar memory mappings for constructing the 32×32 logical array 14. As illustrated in FIGS. 6 and 7, the thirty-two PEs 200 in each 8×4 sub-array 15-0a–15-15b may be wired so that each 8×4 sub-array 15-0a–15-15b represents one row of the 32×32 logical array 14. FIGS. 6 and 7 show where each 8×4 sub-array 15-0a–15-15b is mapped within the 32×32 logical array 14. For example, FIG. 6 show the thirty-two PEs 200 located in the 8×4 sub-array 15-0a forms the first row of the 32×32 logical array 14, while the thirty-two PEs 200 located in the 8×4 sub-array 15-15b forms the last row of the 32×32 array 14. In order for each PE 200 to be able to communicate with its four neighbors of the 32×32 logical array 14 (as shown in FIG. 5), the PEs 200 of the 8×4 sub-arrays 15-0a–15-15b are wired to each other. Some connections are short, since, for example, in the mapping illustrated by FIG. 5, PEs 200 from the 8×4 sub-array 15-0a (corresponding to the first row in the 32×32 logical array 14) are wired to a physically adjacent 8×4 PE sub-array 15-0b. Short connection can be driven using standard single ended CMOS drivers. Other connections are long, for example, in the mapping shown in FIG. 6, PEs from the 8×4 sub-array 15-0a are also wired to PEs 200 from the 8×4 sub-array 15-15b, which is located on the opposite side of the chip. As previously discussed, the long connections may require the use of special drivers and connections to ensure signal integrity at high speeds. The difference between the memory mappings of FIG. 6 and FIG. 7 is that FIG. 7 shows an interleaved arrangement in which sub-arrays 15-0a–15-15a are mapped as a first set of rows while sub-arrays 15-0b–15-15b are mapped as a second set of rows (while reversing the sub-array ordering for 15-0b–15-15b). The interleaved arrangement of FIG. 6 has a smaller maximum PE-to-PE connection distance. This is important since the speed of the active memory chip 100 is limited by the speed of its slowest component. Thus, the length of the longest connection is a limiting factor on the speed of the active memory chip 100.

The memory of the active memory chip 100 must efficiently service the processing requirements of both an external CPU 10 and internal logical array 14 of PEs 200. For the memory mappings shown in FIGS. 6 and 7, the group of thirty-two PEs mapped into each row of the logical array 14 are connected to each bit of the 16-bit word of the active memory chip. However, since each 8×4 sub-array 15-0a–15-15b is only connected to one corresponding memory stripe S00–S07, S10–S17, S20–S27, S30–S37, this means that each memory stripe must contain and drive all 16-bits of the memory word through the full word interface 101. This places another limitation in the speed of the active memory chip since each stripe is require to have connections which span the entire width of the active memory chip 100.

Figure 8:
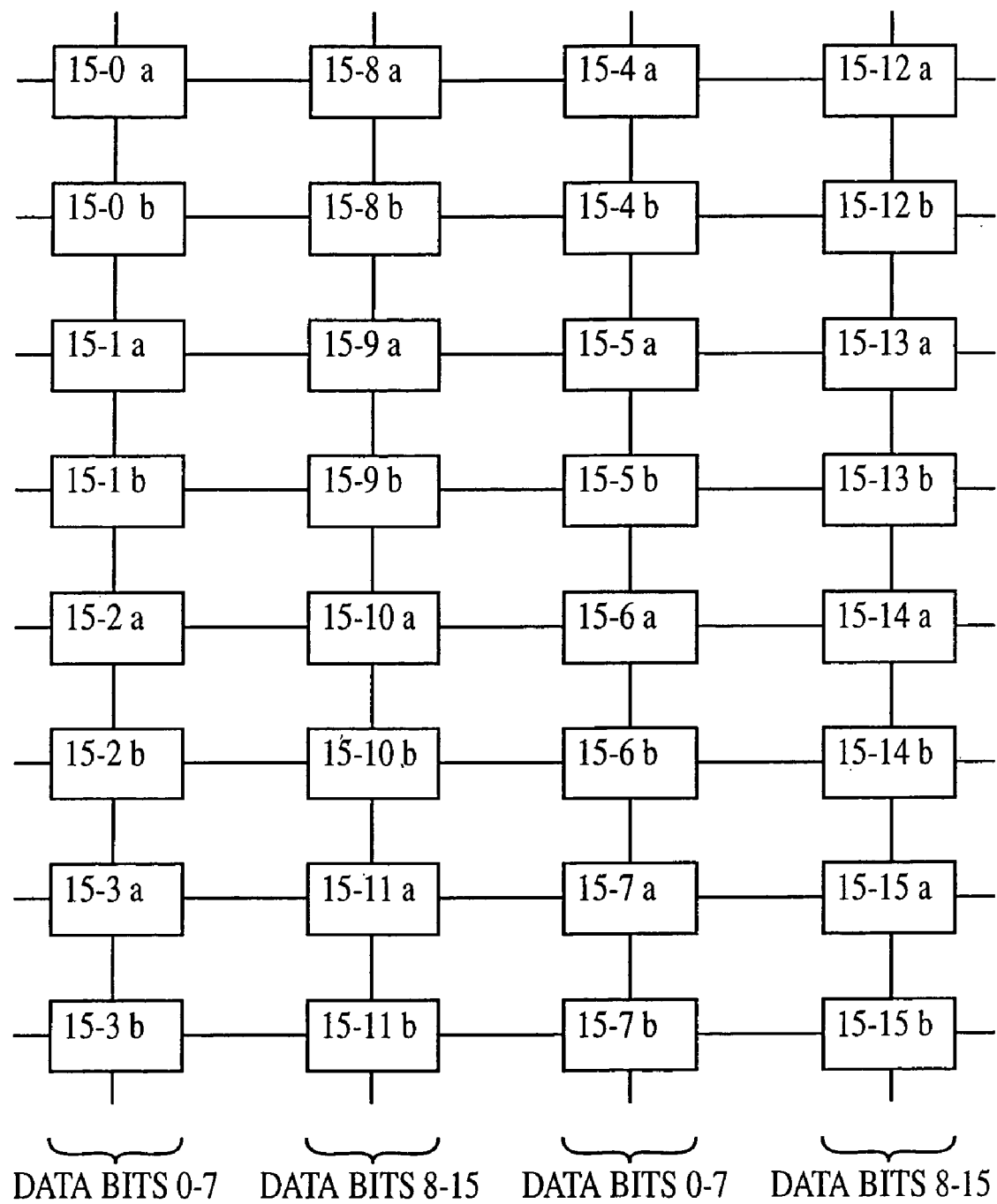

FIG. 8 shows another way of mapping the 8×4 sub-arrays 15-0a–15-15b to form the 32×32 sub-array 14. The memory mapping illustrated by FIG. 8 requires each 8×4 sub-array 15-0a–15-15b be wired as blocks of 8×4. The 8×4 sub-arrays are then connected to each other as shown in the figure. The memory mapping illustrated in FIG. 8 requires that each 8×4 sub-array be connected one byte of data (i.e., either bits 0–7 or bits 8–15 of the word.) In comparison to the mapping shown in FIGS. 6–7, this has the advantage of only requiring each strip drive, via full word interface 101, data along only a portion of the chip. This reduces interconnection lengths between the memory strips 15-0a–15-15b and the full word interface 101, however, it also requires a large number of long interconnects between the PEs 200 of different 8×4 blocks. For example, 8×4 sub-arrays 15-0a–15-3b are wired to 8×4 sub-arrays 15-8a–15-11b and 8×4 sub-arrays 15-4a–15-7b are wired to 8×4 sub-arrays 15-12a–15-15b, respectively. Each of these connections span half the width of the active memory chip 100.

Figure 9:
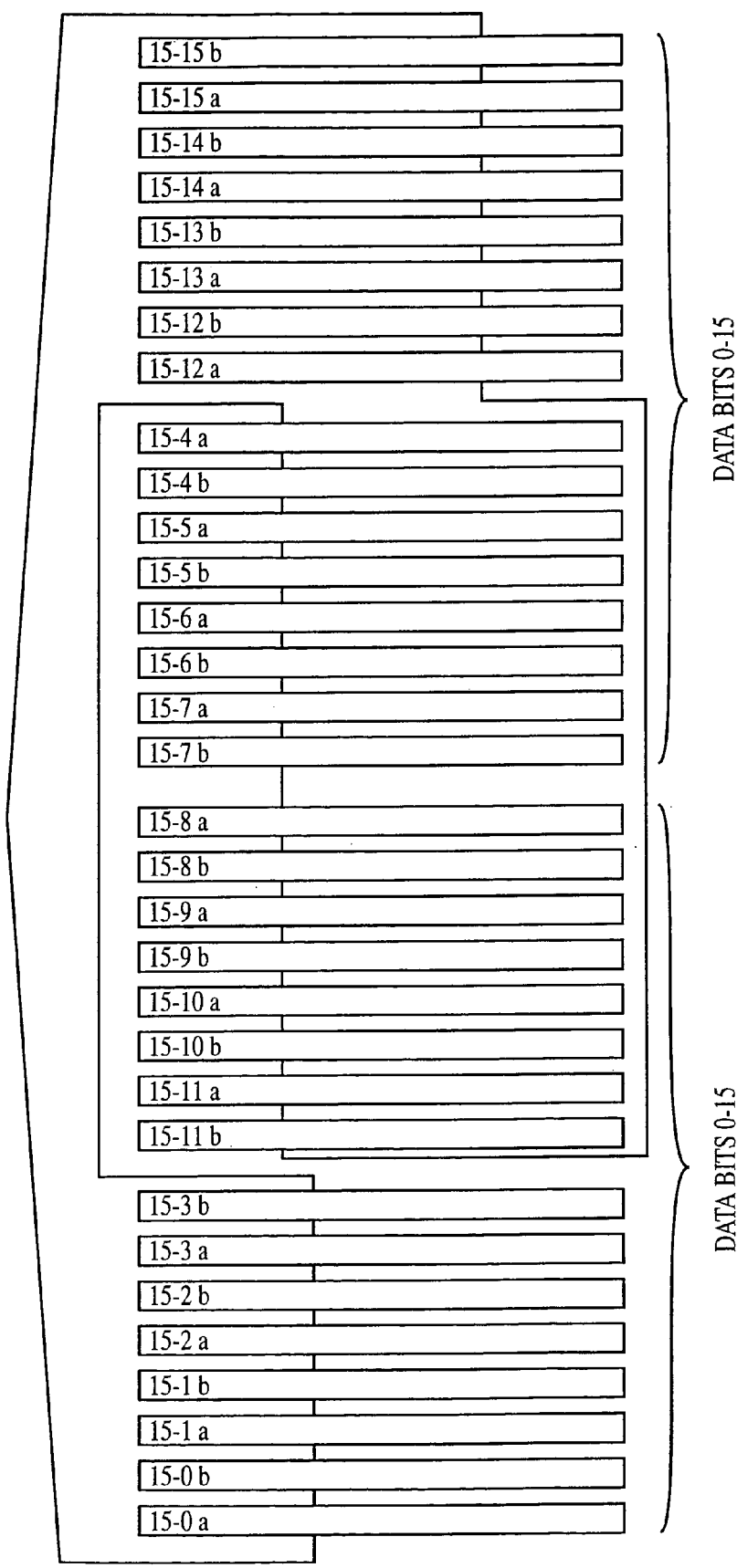

FIG. 9 shows yet another way of mapping the 8×4 sub-arrays 15-0a–15-15b to form the 32×32 sub-array 14. The thirty-two PEs 200 in each 8×4 sub-array 15-0a–15-15b are wired so that each 8×4 sub-array represents one column of the 32×32 logical array 14. Additionally, the memory mapping shown in FIG. 9 reverses the connection order in the second 15-4a–15-7b and third 15-8a–15-11b groups of sub-arrays in order to reduce the amount of required long interconnects.

In summary, the present invention is directed to a single active memory chip 100 containing a plurality of PEs 200 and a memory 12. In the exemplary embodiment, there are 1024 PEs 200 which are logically organized as a 32×32 logical array 14. The 1024 PEs 200 are physically organized into 16 8×8 PE arrays 15-0–15—15. Each 8×8 PE array is organized as 2 8×4 sub-arrays 15-0a––15-15a, 15-0b–15-15b. In the exemplary embodiment, the active memory chip 100 has 128 Mbit of data storage organized as 32 4 Mbit memory stripes S00–S07, S10–S17, S20–S27, S30–S37. Each of the 8×4 sub-arrays 15-0a–15-15b is coupled to one of the memory stripes S00–S07, S10–S17, S20–S27, S30–S37.

The PEs 200 of the active memory chip 100 include an ALU 201, a register file 202, and an interconnect cell 203. In the exemplary embodiment, the register file 202 is implemented using a small DRAM array. Small DRAM arrays are suitable for use as a register file because they use less power and are sufficiently fast. The interconnect cell 203 is the PE's 200 interface to a memory stripe S00–S07, S10–S17, S20–S27, S30–S37 and to 4 other PEs 200.

The PEs 200 of the plurality of sub-arrays 15-0a–15-15b can be wired differently, as described above, in order to form the 32×32 logical array 14. The wiring will require some PEs 200 to communicate with physically distant PEs 200. In order to maintain signal integrity for these long distance connections, the exemplary embodiment utilizes current mode differential logic drivers for long distance signaling.

While certain embodiments of the invention have been described and illustrated above, the invention is not limited to these specific embodiments as numerous modifications, changes and substitutions of equivalent elements can be made without departing from the spirit and scope of the invention. Accordingly, the scope of the present invention is not to be considered as limited by the specifics of the particular structures which have been described and illustrated, but is only limited by the scope of the appended claims.

What is claimed as new and desired to be protected by Letters Patent of the United States is:

1. A method for forming an integrated circuit, comprising:
   providing a substrate;
   forming over the substrate, a full word interface;
   forming over the substrate, a memory, the memory comprising a plurality of memory stripes, each of the memory stripes coupled to the full word interface and comprising a plurality of memory cells;
   forming over the substrate, a plurality of processing arrays, each processing array comprising a plurality of processing sub-arrays including at least a first processing sub-array and a second processing sub-array, each processing sub-array being coupled to a respective memory stripe and each processing sub-array comprising a plurality of processing elements;
   wherein the plurality of processing elements are coupled in accordance with a logical mapping to form a logical array of processing elements in which each processing element of the logical array is coupled to four other processing elements of the logical array.

2. The method of claim 1, wherein the plurality of memory stripes are formed between said full word interface and said plurality of processing arrays.

3. The method of claim 1, wherein each of said processing sub-arrays include a first plurality of data lines formed in a first metal layer in accordance with a first orientation and each of said memory stripes include a second plurality of data lines formed in a second metal layer in accordance with a second orientation, the method further comprising:
   forming a plurality of interconnects to couple said first plurality of data lines to said second plurality of data lines.

4. The method of claim 3, wherein said first orientation and said second orientation are orthogonal.

5. The method of claim 1, wherein the logical mapping comprises, for each processing sub-array, coupling the processing elements to form a line of processing elements.

6. The method of claim 5, wherein the logical mapping further comprises mapping each processing sub-array as a row of the logical array.

7. The method of claim 6, wherein the logical mapping further comprises mapping the processing sub-arrays in accordance with a processing sub-array order as rows of the logical array.

8. The method of claim 1, wherein the logical mapping further comprises:
  mapping, in accordance with a processing array order, a first set of processing sub-arrays taken from the first processing sub-arrays of the plurality of arrays as a first set of rows in the logical array, and
  mapping, in accordance with a reverse of the processing array order, a second set of sub-arrays taken from a second set of sub-arrays taken from the second sub-arrays of the plurality of arrays as a second set of rows of the logical array.

9. The method of claim 1, wherein the logical mapping comprises mapping each processing sub-array as a column of the logical array.

10. The method of claim 9, wherein the processing sub-arrays are divided in a processing array order, into a plurality of sections.

11. The method of claim 10, wherein the sections comprise: a first quarter, a second quarter, a third quarter, and a fourth quarter; and
  wherein the logical mapping further comprises:
  mapping, in accordance with a processing sub-array order, the first quarter as a first set of columns of the logical array;
  mapping, in accordance with a reverse of the processing sub-array order, the second quarter as a second set of columns of the logical array;
  mapping, in accordance with the reverse of the processing sub-array order, the third quarter as a third set of columns of the logical array; and
  mapping, in accordance with the processing sub-array order, the fourth quarter as a fourth set of columns of the logical array.

12. The method of claim 11, further comprising:
  forming over the substrate, connections to electrically couple processing elements of the first processing sub-array of the first quarter to processing elements of a last processing sub-array of the fourth quarter;
  forming over the substrate, connections to electrically couple processing elements of a last processing sub-array of the first quarter to processing elements of a last processing sub-array of the third quarter;
  forming over the substrate, connections to electrically couple processing elements of the first processing sub-array of the third quarter to processing elements of a last processing sub-array of the second quarter; and
  forming over the substrate, connections to electrically couple processing elements of the first processing sub-array of the second quarter to processing elements of the first processing sub-array of the fourth quarter.

13. The method of claim 1, wherein the logical mapping comprises, for each processing sub-array, coupling the processing elements to form a rectangular array.

14. The method of claim 13, wherein the logical mapping further comprises: mapping each processing sub-array as a rectangular region of the logical array.

15. The method of claim 14, wherein the logical mapping further comprises: mapping the processing sub-arrays in accordance with a sub-array order to form columns of rectangular regions of the logical array.

* * * * *

UNITED STATES PATENT AND TRADEMARK OFFICE
CERTIFICATE OF CORRECTION

PATENT NO. : 7,069,416 B2
APPLICATION NO. : 10/859972
DATED : June 27, 2006
INVENTOR(S) : Graham Kirsch It is certified that error appears in the above-identified patent and that said Letters Patent is hereby corrected as shown below:

On Title page, Line 16
In the Abstract, second line from the bottom:

"an drivers" should read --and drivers--.

In the Specification, the following errors are corrected:

Column 2, line 4, "an high" should read --a high--;

Column 2, line 5, "communication" should read --communicate--;

Column 2, line 54, "permits" should read --permit--;

Column 3, line 32, "include" should read --includes--;

Column 3, line 38, "corner" should read --corners--;

Column 3, line 55, "of computer" should read --of a computer--;

Column 3, line 63, "which an be" should read --which can be--;

Column 4, line 38, "make" should read --makes--

Column 4, line 65, "drivers" should read --driver--;

Column 6, lines 46-47, "several of" should read --several--;

Column 6, line 56, "show" should read --shows--;

Column 6, line 67, "connection" should read --connections--; and

UNITED STATES PATENT AND TRADEMARK OFFICE
CERTIFICATE OF CORRECTION

PATENT NO. : 7,069,416 B2
APPLICATION NO. : 10/859972
DATED : June 27, 2006
INVENTOR(S) : Graham Kirsch It is certified that error appears in the above-identified patent and that said Letters Patent is hereby corrected as shown below:

Column 7, line 51, "span" should read --spans--.

Signed and Sealed this

Tenth Day of October, 2006

JON W. DUDAS
*Director of the United States Patent and Trademark Office*